3,219,653
METHODS OF OXYGEN-PROOFING OF POLYETHYLENES

James Neil Henderson, Hudson, Ohio, assignor, by mesne assignments, to the United States of America as represented by the Secretary of the Navy
No Drawing. Filed Aug. 14, 1962, Ser. No. 217,780
1 Claim. (Cl. 260—94.9)

This application is a continuation in part of application Serial Number 13,664, filed March 8, 1960, now abandoned.

This invention relates to improvement in methods for enhancing the characteristics of polyethylenes, and more particularly pertains to methods of oxygen-proofing of polyethylenes by immersion in corrosive liquids.

Acids and other highly corrosive reagents degrade polyethylene, but at moderate temperatures the decay is slow. While the plastic discolors, it retains its physical streength despite long contact with the corrosive liquid. (Polyethylenes are characterized by a chain of singly-bonded carbon atoms mainly bearing hydrogen atoms. Such a paraffin skeleton should be stable, but polyethylenes do not have an ideal and linear paraffin structure: oxygen can be present in the forms >C=O and

and carbon-carbon double bonds are also present. Probably, degradation of the plastic involves reactions with such unstable structures.)

What holds for corrosive reagents such as acids applies, with slight exception, for molecular oxygen. Oxygen is presumed to attack the polymer at or near these oxygenated structures, or double bonds. If the polymer were purely paraffin, deterioration should be negligible except at temperatures well above the melting point of the plastic. In fact, the damage apparently spreads beyond the locations of the original weak structures—because their destruction leaves a greater number of new weak sites. Once begun, the degradation extends with increasing speed along the polymer chains. Unlike most liquid agents, however, oxygen permeates polyethylenes at a rate sufficient to allow deep penetration and considerable acceleration of this process.

Commonly, exposure to a corrosive reagent increases the degradation produced in a subsequent exposure to oxygen. However, a limited number of reagents have been found to stabilize certain polyethylenes against subsequent attack by oxygen.

Modification of polyethylene by saturation of its residual double bonds, particularly in chlorination and chlorosulfonation processes involving treatment of the plastic in solution, has provided improved oxygen and ozone resistance. This has been true particularly in the case of chlorosulfonated polyethylene. But past practice did not teach the improving of these properties by an immersion of the solid polymer in liquid, nor treatment with a conventional acid. While it was known that polyethylene surfaces take ink better after immersion in chromic acid solutions, such solutions accelerate the subsequent rate of oxidation.

The subject invention provides a protective acid-immersion treatment for each of two types of polyethylene, a conventional low density material (DYNH-3), a branched polyethylene having a molecular weight of about 21,000 and a density of about 0.92, and a high density Ziegler material (Superdylan, a linear polyethylene prepared at relatively low pressure with Ziegler catalyst, and having a molecular weight between 30,000 and 100,000). Immersion in sulfuric acid at 90° to 100° C. for one hour is found to protect both.

At room temperature, very inferior results were obtained with respect to the branched chain species even though it was immersed for 21 hours. In fact, a 15 minute immersion at room temperature produced treated samples which were not only not superior to controls but rather, in some ways, quite inferior to controls. For instance, it was found that, in some cases, the samples immersed at room temperature absorbed significantly more oxygen than the control samples and on prolong exposure to oxygen, the physical condition of the samples immersed in dilute sulfuric acid were no better than that of the controls. Therefore, in order to impart the desired amount of oxygen resistant to the samples, the temperature of the immersion should be between 90° and 100° C. Alternatively, immersions of up to three hours in glacial acetic acid at 90° to 100° C. gives very good protection to Superdylan, with only a trace of heat distortion and no change in color of the plastic.

Neither hot acid immersion alters the tensile properties of the polyethylene. Where immersion prevents subsequent oxygen uptake, tensile properties remain high. Where protection is incomplete, as with 30 mil sulfuric acid treated DYNH-3, the oxygen that is absorbed subsequent to the treatment does notably less damage than the same amount of oxygen does with no treatment. Since the rate of oxygen uptake in any case eventually goes into a very slow stage after passing through a maximum, even a partially protected material can survive an extremely long oxygen exposure without embrittlement— while its strength and flexibility decrease, the degradation slows down before the material cracks or becomes brittle.

Negatively, the immersion of DYNH-3 in hot aqueous solutions of hydrochloric acid, sodium hydroxide, phosphoric acid, potassium permanganate and potassium dichromate, with various concentrations of sulfuric acid, had a negligible effect or accelerated the rate of subsequent oxidation.

Acetic anhydride and aqueous solutions of hydrochloric, sulfuric and nitric acids all had some effect as treating agents for Superdylan, especially acetic anhydride, but none was as effective as acetic acid.

Proof of characteristics was established by cutting samples in the form of tensile bars, and immersing such samples in the treating liquid while maintaining the temperature between 90° and 100° C. by means of a water bath, or by keeping the assembly in an electric oven. After immersion, the samples were washed in cold running tap water for about one minute, and dried by the application of absorbent paper. Samples were exposed to pure oxygen at one atmosphere pressure at 100° C. over calcium oxide. Gas volume changes were read at constant pressure. Tensile tests were then made. (The fact that most of the specimens in the 3 mil Superdylan series tore irregularly before breaking stems from the conspicuous inhomogeneity of the material.) Weights and infrared spectra were then obtained:

dation of Superdylan does not depend primarily on the presence of double bonds.

*Oxygen-proofing of polyethylene by immersion in corrosive liquids*

| Material | Treatment | | Weight change in treatment (mgm. per sample) | Oxygen absorbed at 100° C. (cc. per gram) | | |
|---|---|---|---|---|---|---|
| | Hours | Liquid at 90–100° C. | | in 100 hours | in 200 hours | in 300 hours |
| 30 mil DYNH-3 | 0 | None | | | Not exposed | |
| | 0 | ----do---- | | [1] 12 | 45 [1] | [1] 92 |
| | 2 | Conc. $H_2SO_4$ | | | Not exposed | |
| | 2 | Conc. $H_2SO_4$ | +0.5 | 4.0 | 43 | [2] (55) |
| | 5 | Conc. $H_2SO_4$ | | | Not exposed | |
| | 5 | Conc. $H_2SO_4$ | +1.4 | 5.0 | 45 | (50) |
| | 3 | Glac. HOAc | +14.9 | 29 | | |
| 5 mil DYNH-3 | 0 | None | | | Not exposed | |
| | 0 | ----do---- | | [1] 15 | 59 [1] | [1] 115 |
| | 1 | Conc. $H_2SO_4$ | +0.1 | | Not exposed | |
| | 1 | Conc. $H_2SO_4$ | +0.3 | 0 | 0 | (0) |
| 3 mil S-D | 0 | None | | | Not exposed | |
| | 0 | ----do---- | | 58 | (79) | (87) |
| | 3 | Glac. HOAc | −2.5 | | Not exposed | |
| | 3 | Glac. HOAc | −1.6 | 0 | 2 | (2) |
| | 3 | AcOAc | −1.4 | 12 | 18 | (23) |
| | 1 | Conc. $H_2SO_4$ | +0.8 | | Not exposed | |
| | 1 | Conc. $H_2SO_4$ | +0.8 | 11.5 | (35) | |
| | 3 | Conc. $H_2SO_4$ | +0.3 | | Not exposed | |
| | 3 | Conc. $H_2SO_4$ | +1.0 | 8.5 | (35) | |
| | 3 | 10 N HCl | +0.1 | 26 | 65 | (83) |
| | 3 | 50% $H_2SO_4$ | −0.4 | 22 | 57.5 | (70) |
| | 3 | 6 N $HNO_3$ | +0.1 | 52 | 70 | (83) |

| Material | Treatment | | Reflected color after treatment | Reflected color after oxygen | Weight [3] gain in oxygen (mgm. per sample) | Ultimate tensile strength (p.s.i.) | Elongation, percent |
|---|---|---|---|---|---|---|---|
| | Hours | Liquid at 90–100° C. | | | | | |
| 30 mil DYNH-3 | 0 | None | White | | | 2,350 [1] | 690. [1] |
| | 0 | ----do---- | ----do---- | Yellowish | | Brittle [1] | Brittle. |
| | 2 | Conc. $H_2SO_4$ | Grey-brown | | | 2,100 | 620. |
| | 2 | Conc. $H_2SO_4$ | ----do---- | Bright tan | 19.4 | 1,800 | 320. |
| | 5 | Conc. $H_2SO_4$ | Black | | | 2,300 | 640. |
| | 5 | Conc. $H_2SO_4$ | ----do---- | Brown | 16.3 | 1,700 | 280. |
| | 3 | Glac. HOAc | White | White | 33.3 | Brittle | Brittle. |
| 5 mil DYNH-3 | 0 | None | White | | | 2,600 [1] | 360. [1] |
| | 0 | ----do---- | ----do---- | Yellowish | | Brittle [1] | 400. |
| | 1 | Conc. $H_2SO_4$ | Grey-brown | | | 2,400 | |
| | 1 | Conc. $H_2SO_4$ | ----do---- | Pale tan | | | |
| 3 mil S-D | 0 | None | White | | | 2,100 S.T. | 380. |
| | 0 | ----do---- | ----do---- | Yellowish | 4.3 | Brittle | Brittle. |
| | 3 | Glac. HOAc | ----do---- | ----do---- | | 2,400 | 320. |
| | 3 | Glac. HOAc | ----do---- | White | 1.0 | 2,100 S.T. | 60. |
| | 3 | AcOAc | ----do---- | Yellowish | 0.6 | | |
| | 1 | Conc. $H_2SO_4$ | Pale grey-brown | | | 2,600 | 320. |
| | 1 | Conc. $H_2SO_4$ | ----do---- | Tan | 1.6 | Brittle | Brittle. |
| | 3 | Conc. $H_2SO_4$ | Grey-brown | | | 1,454 | 180. |
| | 3 | Conc. $H_2SO_4$ | ----do---- | Brown | 1.5 | Brittle | Brittle. |
| | 3 | 10 N HCl | White | Yellowish | 3.0 | ----do---- | Do. |
| | 3 | 50% $H_2SO_4$ | ----do---- | ----do---- | 3.2 | ----do---- | Do. |
| | 3 | 6 N $HNO_3$ | ----do---- | ----do---- | 1.0 | ----do---- | Do. |

[1] Average of several runs.
[2] Figures in brackets are projected.
[3] Weight grains are not strictly comparable because periods of oxygen exposure differ.

S.T. Slow tear in tensile testing.

The mechanism of the action of the acids employed can be infrared from changes in the infrared spectra. In the case of DYNH-3, a conventional low density polyethylene, the action of sulfuric acid includes a saturation of double bonds. Formation of both ethers and sulfate esters probably occurs. While the blackening is not fully explained, it probably arises from deposits of free carbon as the end result of a charring process that begins with dehydration. However, as the blackened plastic is exposed to oxygen at 100° C., it tends to lighten considerably, as though the black material itself were oxidized.

High density polyethylene has a lower proportion of double bonds than conventional polyethylene, and the sulfuric acid treatment is less effective. Double bond elimination can be detected, but with less assurance than in the case of conventional polyethylene. Acetic acid does not appear to effect the double bond concentration in either type. Accordingly, and because Superdylan (high density polyethylene) oxidizes more rapidly at first than conventional polyethylene, it appears that the oxidation of Superdylan does not depend primarily on the presence of double bonds.

A marked effect of acetic acid on the infrared spectrum of Superdylan is an increased absorption, which may be ascribed to an increase in carboxyl ion, an increase which is not observed in DYNH-3. The corresponding cation must have been that of a metal, because nitrogenous bases are absent. The appearance of carboxyl ion thus indicates that the crucial difference between Superdylan and DYNH-3 with respect to oxidation is the presence of a metal or metals in Superdylan.

This is consistent with the interpretation that Superdylan contains a remnant of the Ziegler catalyst which in some way accelerates the attack of oxygen on the polymer. Typically, the catalyst is reported to be triethyl aluminum, with titanium tetrachloride, zirconium tetrachloride, or nickel chloride as promoters. With acetic acid, this residue, or part of it, could form metal acetate linkages, presumably leaving the metal in a form which does not enhance oxygen attack on the polymer. It is also plausible that the acid leaches out some of the oxidation-promoter, since there is a weight loss of the order of ten milligrams per gram of plastic.

If inactivation of a metal constituent is the key to oxygen-proofing of Superdylan, acids other than acetic should also be effective. The mineral acids which have been tried proved in fact to be less effective than acetic acid. Possibly this is due to a greater ease of permeation of the organic acid.

Each of the aqueous acid solutions tried (hydrochloric, sulfuric, nitric) had some protecting effect, but not nearly that of acetic acid. Ionic chloride would not have shown up in the infrared 2–15 micron range. Ionic sulfate was not detected in the infrared spectrum of Superdylan after treatment with 50% sulfuric acid, nor with concentrated sulfuric acid. With 6 normal nitric acid, a moderate new band appeared at 11.75 microns, which is consistent with ionic nitrate, and there is no other group to which this could logically be assigned. Nitric acid, however, produces other changes (covalent nitrate and nitro group, probably unconjugated) which either constitute degradation or enhance it.

Acetic anhydride treatment more nearly approaches the effectiveness of acetic acid. It differs in the appearance of new bands probably associated with ester formation, although it also shows a carboxyl band at least as strong as that obtained with acetic acid.

The subject process, in addition to enhancing oxidation resistance, inactivates or removes the catalyst remnant in polyethylene, thereby facilitating molding. The sulfuric acid treatment of conventional polyethylene provides an equivalent of leading the plastic with carbon black to avoid oxidation.

Obviously many modifications and variations of the present invention are possible in the light of the above teachings. It is therefore to be understood that within the scope of the appended claim the invention may be practiced otherwise than as specifically described.

I claim:

A method of rendering a linear chain, high density, low pressure polyethylene resistant to oxidation comprising: immersing said polyethylene in glacial acetic acid at a temperature of 90° C. to 100° C. for about 3 hours.

References Cited by the Examiner
FOREIGN PATENTS 572,811   5/1959   Belgium.

JOSEPH L. SCHOFER, *Primary Examiner.*